United States Patent
Janssen

[11] Patent Number: 5,868,515
[45] Date of Patent: Feb. 9, 1999

[54] YOKE FOR APPLICATOR HANDLE

[75] Inventor: Robert Ives Janssen, Mendota Heights, Minn.

[73] Assignee: Padco, Inc., Minneapolis, Minn.

[21] Appl. No.: 804,593

[22] Filed: Feb. 24, 1997

[51] Int. Cl.[6] ................................................. F16C 11/10
[52] U.S. Cl. .......................... 403/97; 403/4; 403/119; 16/225; 16/249
[58] Field of Search ........................... 403/97, 96, 94, 403/84, 91, 145, 157, 3, 4, 119; 15/144.1; 16/225, 249

[56] References Cited

U.S. PATENT DOCUMENTS

| | | | |
|---|---|---|---|
| D. 307,963 | 5/1990 | Newman, Sr. et al. | D32/41 |
| D. 331,650 | 12/1992 | Newman, Sr. | D32/35 |
| 959,211 | 5/1910 | Flach | 15/144.1 X |
| 1,334,586 | 3/1920 | Baker | 403/97 X |
| 1,340,931 | 5/1920 | Cazel et al. | 403/97 X |
| 1,627,901 | 5/1927 | Hills | 403/97 X |
| 2,555,226 | 5/1951 | Draughn | 15/144.1 X |
| 3,986,743 | 10/1976 | Bjurling et al. | 294/19 R |
| 4,127,911 | 12/1978 | Cupp et al. | 15/210 R |
| 4,134,173 | 1/1979 | Cupp et al. | 15/210 R |
| 4,194,852 | 3/1980 | Cupp et al. | 403/299 |
| 4,196,610 | 4/1980 | Chilton | 403/97 X |
| 4,473,918 | 10/1984 | Moss et al. | 15/144 R |
| 4,528,714 | 7/1985 | Beck | 15/230.11 |
| 4,594,816 | 6/1986 | Goldstein | 51/393 |
| 4,731,896 | 3/1988 | de La Tour. | |
| 4,742,596 | 5/1988 | Altman | 15/210 R |
| 4,896,394 | 1/1990 | Linn et al. | 15/230.11 |
| 4,976,651 | 12/1990 | Frank | 446/421 |
| 4,993,101 | 2/1991 | Newman, Sr. et al. | 15/245 |
| 5,220,707 | 6/1993 | Newman, Sr. et al. | 16/115 |
| 5,293,662 | 3/1994 | Newman, Sr. et al. | 15/210.1 |
| 5,544,384 | 8/1996 | Forselius et al. | 15/235.7 |
| 5,573,630 | 11/1996 | Edney et al. | 156/577 |
| 5,626,168 | 5/1997 | Garnett | 16/225 X |

FOREIGN PATENT DOCUMENTS

| | | | |
|---|---|---|---|
| 2517078 A1 | 10/1976 | Germany. | |
| 58177 | 7/1937 | Norway | 15/144.1 |
| 2247717 | 3/1992 | United Kingdom | 16/225 |

OTHER PUBLICATIONS

UK Patent Application GB 2 051 219 A, Jan. 1981.

*Primary Examiner*—Harry C. Kim
*Attorney, Agent, or Firm*—Jacobson & Johnson

[57] ABSTRACT

A yoke member comprises a pair of handle-engaging members supported from a connecting member with at least one of the handle-engaging members attached to the connecting member with a living hinge to provide a one-piece attachment for a tool to enable a tool handle to be secured between the handle-engaging members.

15 Claims, 6 Drawing Sheets

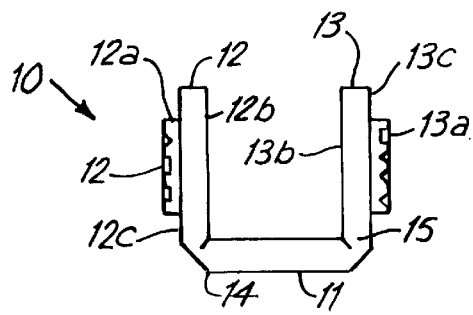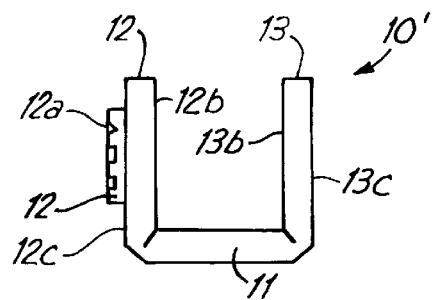
Fig. 1    Fig. 1A
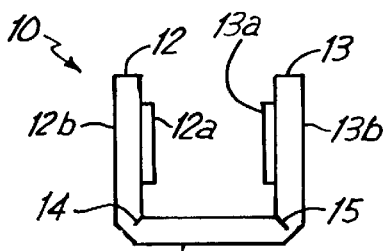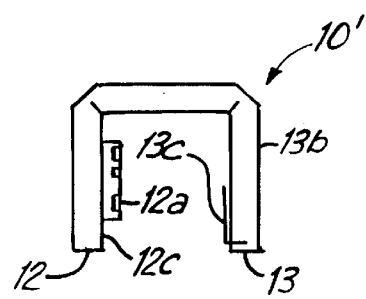
Fig. 2    Fig. 2A
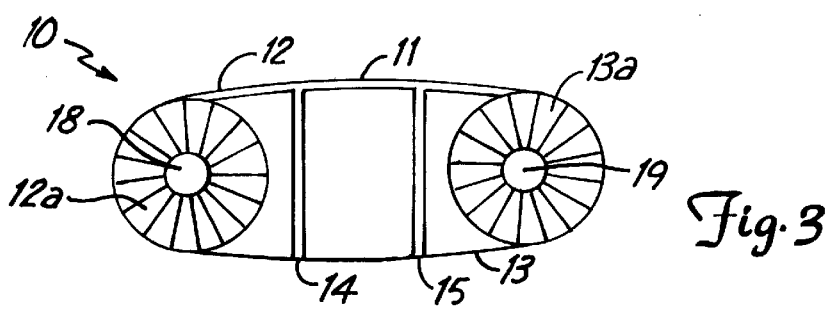
Fig. 3
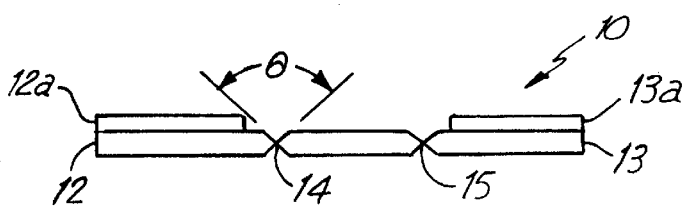
Fig. 4

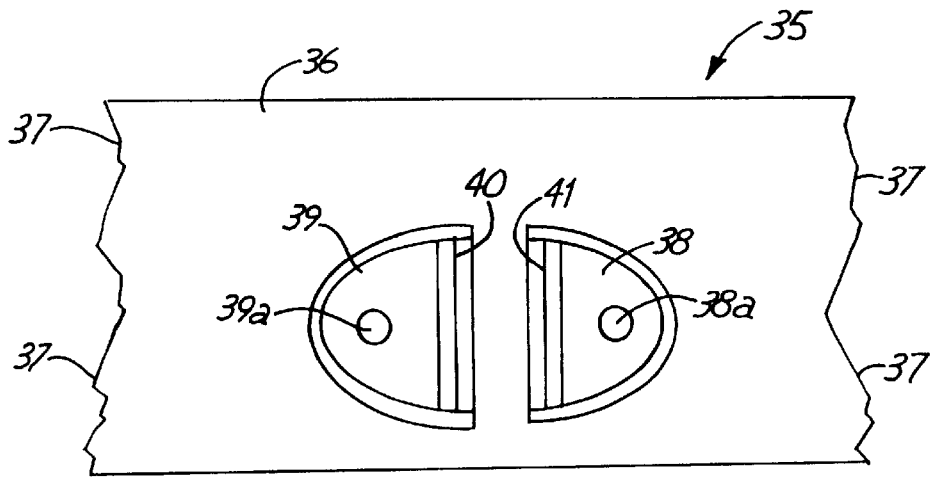
Fig. 7
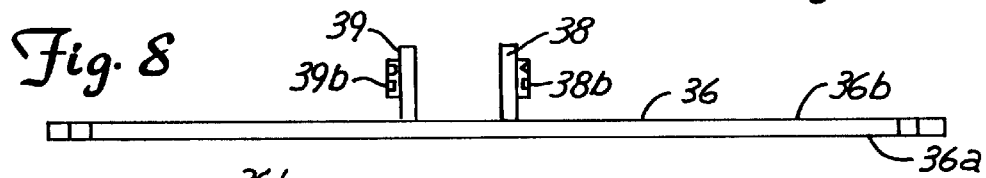
Fig. 8
Fig. 8a
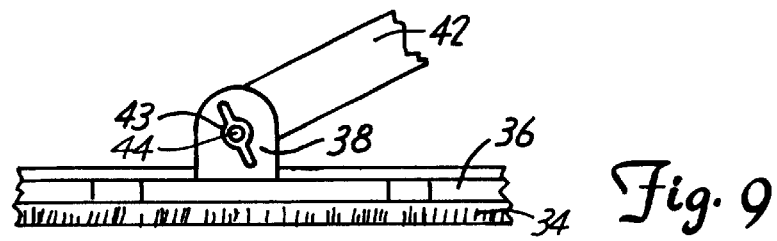
Fig. 9
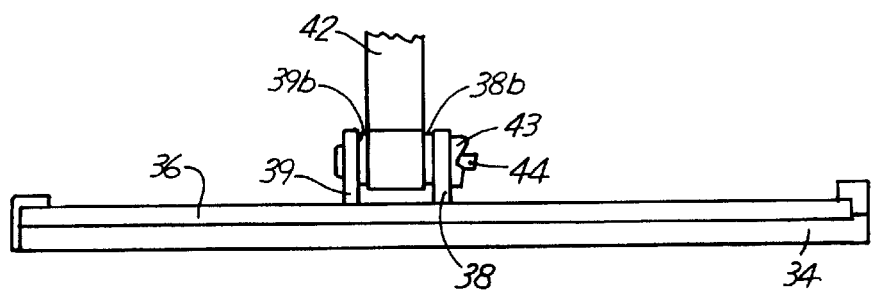
Fig. 10

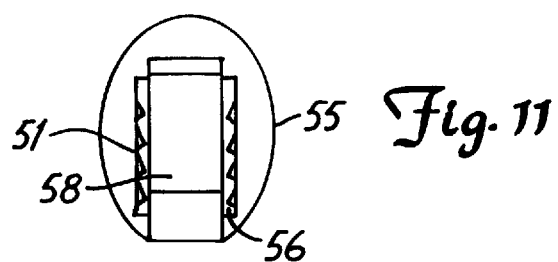
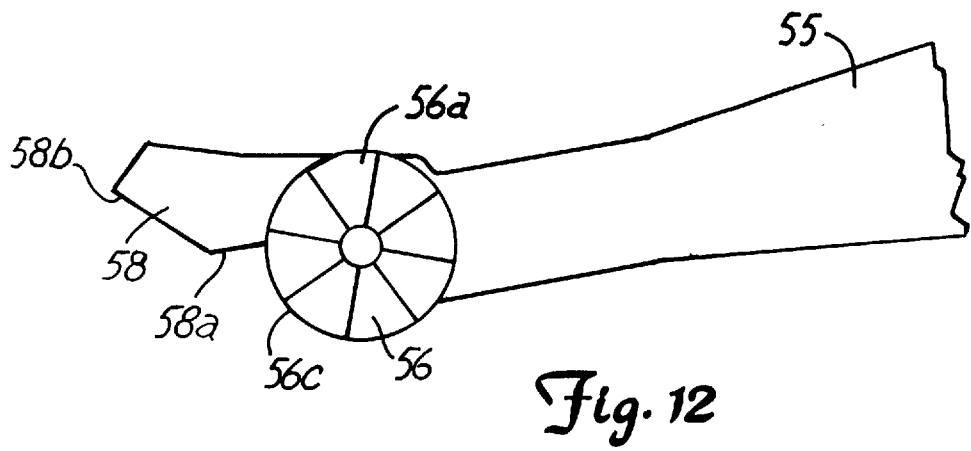

YOKE FOR APPLICATOR HANDLE

FIELD OF THE INVENTION

This invention reates generally to a yoke mechanism and, more particularly, to a yoke mechanism for engaging a tool handle.

BACKGROUND OF THE INVENTION

The concept of tools, wherein a yoke or some type of holder, connects the tool to the handle is old in the art. In one embodiment, the present invention provides an improved one-piece yoke that can be secured to a tool and to a handle to hold the handle in either a fixed position relative to the tool or in a pivotable condition relative to the tool.

In certain applications, such as painting tools, the operator may want to hold the handle in either a pivotable position with respect to the painting tool or in a fixed position with respect to the painting tool. In addition, since painting tools are often used for a limited time before disposal, the yoke should be inexpensive and preferably made from a material such as a polymer plastic.

The present invention provides a yoke that can be molded from a single piece of plastic with one embodiment of the yoke having yoke members that can be pivoted within an arc of 180 degrees to present one of two surfaces to a handle. In another embodiment, the yoke can be integral with at least a portion of the tool so that an operator can attach a handle thereto.

DESCRIPTION OF THE PRIOR ART

U.S. Pat. No. 4,896,394 discloses an extension handle where the handle is threaded into an insert located at the bottom of an open handle.

U.S. Pat. No. 4,742,596 shows a tool for cleaning having a yoke that is squeezeable onto a member to hold the member in position within the yoke.

U.S. Pat. No. 4,731,896 discloses an adjustable toothbrush with different types of joints for positioning the toothbrush sections.

U.S. Pat. No. 4,528,714 discloses an adjustable paint roller with a clamp in the handle for adjusting the angle of the handle.

U.S. Pat. No. 3,986,743 discloses a locking toggle joint with lugs that are mounted to a member with living hinges to enable the lugs to be secured over joint surfaces on another member.

U.S. Pat. No. 4,473,918 discloses a pivot handle for dust mops that uses a bolt and wing nut to clamp two members together.

U.S. Pat. No. 4,976,651 discloses a clacker apparatus with a living hinge integral with the handle on his clacker apparatus.

U.S. Pat. No. 5,544,384 discloses a wall-corner fishing tool with a clamp member for holding the wall-corner finishing tool at the proper angle.

U.S. Pat. No. 4,594,816 discloses a universal living hinge joint for use in transmitting force to a tool.

U.S. Pat. No. 5,293,662 discloses a corner-paint pad assembly with a handle pivotally secured to the corner-paint pad assembly.

U.S. Design Pat. No. 331,650 discloses a handle for painting tools with the handle including a threaded member for engaging the painting tool.

U.S. Design Pat. No. 307,963 discloses a squeegee handle with the handle secured to the head by a bolt and nut.

U.S. Pat. No. 4,993,101 shows a tool with an axially rotatable tool mounted on the handle.

U.S. Pat. No. 5,220,707 discloses a tool extender with telescoping members that can be squeezed to hold the tool extender in position U.S. Pat. No. 4,134,173 discloses a paint applicator with a reversible handle.

U.S. Pat. No. 5,573,630 discloses a wallpaper applicator with a handle for extending into the roll of wallpaper.

U.S. Pat. No. 4,127,911 shows an applicator with a multi-positionable handle that can be attached to hooks on the applicator.

U.S. Pat. No. 4,194,852 shows an applicator with a multi-positionable handle that can be attached to hooks on the applicator.

UK. Patent GB 2051,219 discloses a plastic part with a living hinge.

German patent 25 17 073 discloses a plastic part with a living hinge.

SUMMARY OF THE INVENTION

Briefly, the yoke member comprises a pair of handle-engaging members supported from a connecting member, with at least one of the handle engaging members attached to the connecting member with a living hinge to provide a one-piece attachment for a tool. In another embodiment, the yoke member is integrally formed with a planar section of the tool to allow the yoke member to be temporarily secured to the head of a tool.

BRIEF DESCRIPTION OF THE DRAWINGS

FIG. 1 is an end view of the yoke member in a first position;

FIG. 1a is an end view of an alternate embodiment of a yoke member in a first position;

FIG. 2 is an end view of the yoke member of FIG. 1 in a second position;

FIG. 2a shows the alternate embodiment of FIG. 1a with the handle-engaging members reversed;

FIG. 3 is a top view of the yoke member of FIG. 1 in an unfolded condition;

FIG. 4 is an end view of the yoke member of FIG. 3 in an unfolded condition;

FIG. 7 is a top view of a tool with an integral yoke;

FIG. 8 is an end view of the tool of FIG. 7 with the yoke members extending upward for pivoting engagement with a handle;

FIG. 8a is an end view of the tool of FIG. 7 with the yoke members hinged downward for locking engagement with a handle;

FIG. 9 is a side view of the tool of FIG. 7 with a handle attached thereto;

FIG. 10 is front view of the tool of FIG. 7 with a handle attached thereto;

FIG. 11 is an end view of a handle for engaging the yoke of the present invention;

FIG. 12 is a side view of the handle of FIG. 11;

DESCRIPTION OF THE PREFERRED EMBODIMENT

Figure 5:
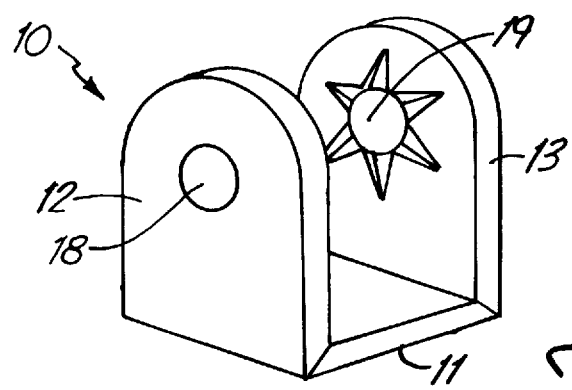
FIG. 5 is a perspective view of the yoke member in the second position of FIG. 2.

Referring to FIG. 1, reference numeral 10 designates a one-piece molded reversible yoke for attachment to a handle, with the yoke in a first position. Yoke 10 includes a first yoke member 12 having a first side 12c with a lug 12a thereon, and a second side 12b with a smooth surface thereon. Similarly, yoke 10 includes a second yoke member 13 having a first side 13c with a lug 13a thereon, and a second side with a smooth surface 13b thereon. Located between yoke member 12 and yoke member 13 is a connecting member 11 having a first edge joined to the edge of the first yoke member 12 by a first living hinge 14 and having a second edge joined to the edge of second yoke member 13 by a second living hinge 15, with living hinges vendible into a first yoke position, where the smooth surfaces 12b and 13b are presentable to a handle mounted therein. While yoke member 10 can be formed by various methods, the yoke member is suitable for molding from a polymer plastic such as polyethylene. That is, the incorporation of living hinges into the yoke member allows molding the yoke member in a flat condition as shown in FIG. 4. By molding in a flat condition, the lugs 12a and 13a can be made with significant engaging surfaces as the mold can be pulled directly up from the molded part. If the yoke member were to be molded in the shape as shown in FIG. 1 with a conventional mold, the lugs could not be formed with the protruding engaging surfaces as the lugs would not clear the mold. By incorporation of living hinges, one can mold the lugs to the desired depth to obtain the proper engaging surfaces for the yoke member.

Referring to FIG. 1a, the yoke 10' is shown with identical components except locking lug 13a has been removed from yoke member 13. In the condition shown in FIG. 1a, a handle placed between surfaces 12b and 13b can be pivotally attached thereto, as surfaces 12b and 13b lack lug surfaces to lockingly engage a handle.

FIG. 2a shows yoke 10' with yoke members 12 and 13 pivoted 180 degrees. In this condition, lug 12a faces inward so that a handle with a lug can be engaged therewith. Thus, the embodiment shown in FIG. 2a and use of a handle with a lug on one face and a smooth face on the opposite side allows one to change the tool from a locked condition to a pivoting condition by rotating the handle 180 degrees. That is, a handle with one lug and one smooth face can be used in the locked position by having the lug on the handle engage the lug on the yoke, or in the pivoting position, by having the lug on the handle engage the smooth surface 13c and the lug 12a engage the smooth surface of the handle.

Referring to FIG. 2, the yoke 10 of FIG. 1 has been folded into a second condition where the lugs 12a and 13a are presentable to a handle mounted therein and are clampable to a handle mounted therebetween. Thus, the present invention is suitable for use in two modes: a first mode where the smooth surfaces 12b and 13b engage a handle and a second mode where the lug surfaces 12a and 13a engage the tool handle and prevent it from rotating. In the first mode, the handle can pivot with respect to the yoke and the tool. In the second mode, the lug surfaces 12a and 13a engage the tool handle and prevent rotation of the tool. Consequently, with a single yoke member, one can readily convert the tool from a pivotable or swivelable tool handle to a rigid-tool handle.

FIG. 3 and FIG. 4 illustrate a top view of the yoke 10 in an unfolded condition, with the yoke 10 formed from a single piece of plastic with the double-acting living hinge 14 connecting yoke 12 to connecting member 11 and the living hinge 15 connecting yoke 13 to connecting member 11. An opening 18 is located in yoke member 12 and, similarly, an opening 19 is located in yoke member 13. The openings allow a fastener to be extended therethrough and though a handle located between the two yoke members. The living hinges 14 and 15 are located centrally within the thickness of the connecting member.

Having the living hinges centrally located and with an included angles of θ of 90 degrees allows for folding of the yoke members into the position shown in FIG. 1 as well as the position shown in FIG. 2 with the yoke member having the same overall dimensions in either position.

FIG. 5 shows a perspective view of yoke 10 with openings 18 in yoke member 12 and opening 19 in yoke member 13, with the openings suitable for receiving a fastener that can clamp yoke members 12 and 13 around a handle located therebetween.

Figure 6:
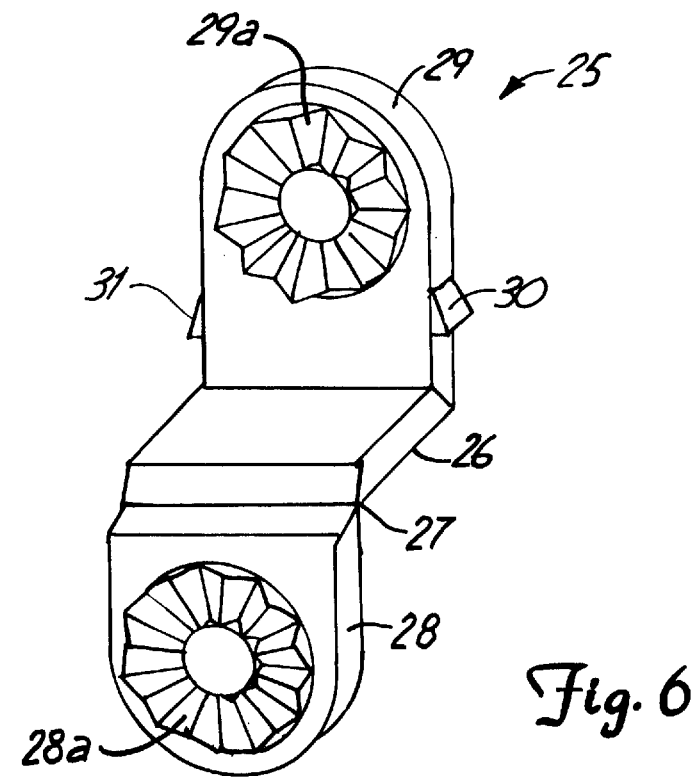
FIG. 6 is an alternate embodiment of a yoke member.

FIG. 6 shows a perspective view of an alternate embodiment of a yoke 25, with yoke 25 similar to yoke 10 except yoke 25 is formed with a single living hinge 27 that connects connecting member 26 to yoke member 28. Yoke member 29 connects to connecting member 26 through a rigid right-angle connection. In addition, yoke member 29 includes stops 30 and 31 for engagement with a tool to hold yoke 25 in position on a tool. Yoke 25 is suitable for those instance when the advantage of reversible yoke that can support a handle in either a locking engagement to a pivotal engagement is unnecessary. In the embodiment shown in FIG. 6, the living hinge 27 is formed at the lower edge of connecting member 26 and yoke member 28 rather than at the middle since the yoke is only foldable into engagement in one condition. The advantage of a yoke with only one foldable yoke member is that the yoke can be inserted into engagement with extensions on tools by positioning yoke 28 so it passes under a hook on a tool and then folded upward so that yoke 28 is brought to the upright condition parallel to yoke member 29.

FIG. 7 shows an alternate embodiment of the invention comprising a painting tool 35 for supporting a painting pad (not shown) with the yoke integrally formed in paint tool 35 having ears 37 for attachment to a paint pad. The integral attachment for a handle comprises a generally planer member 36 for forming a part of a tool such as a paint-applicator pad. Planar member 36 includes a first yoke member 38 formed from a planer member 36, a first living hinge 41 securing yoke member 38 to planar member 36 to enable the first yoke member 38 to be pivoted out of planar member 36 as shown in FIG. 7 and into the engagement position as shown in FIG. 8 which is substantially at a right angle to planar member 36. Similarly, planar member 36 includes a second yoke member 39 formed from a portion of planar member 36, with a second living hinge 40 securing yoke member 39 to planar member 36 to enable the second yoke member 39 to be pivoted out of planar member 36 as shown in FIG. 7 and into the engagement position as shown in FIG. 8 which is substantially at a right angle to planar member 36. In this condition, openings 39a and 38a (FIG. 7) permit a fastener such as a bolt and wing nut to secure a tool handle thereto. Thus, the embodiment of FIG. 7 allows a yoke to be integrally formed from a portion of the tool by enabling yoke member 38 and 39 to be pivoted out of planar member 36 until yoke members 38 and 39 extend substantially at a right angle to planar member with 36 yoke member 38 and yoke member 39 spaced sufficiently far apart so that a handle can be secured between yoke member 38 and yoke member 39.

In the embodiment shown in FIG. 7, yoke members 38 and 39 are molded with smooth surfaces so that a handle can be pivotable pivotally mounted thereto; FIG. 8 shows lugs 38b and 39b are molded into yoke members 38 and 39 similarly to the lugs molded into the embodiment of FIGS. 3 and 4 as planar member 36 can also be molded in a flat condition as shown in FIG. 7.

FIG. 8 illustrates paint tool 35 with the smooth surfaces of yoke members 38 and 39 facing inward. In this condition, the tool can form a pivoting relationship to a handle with surface 36a forming a pad-holding surface and surface 36b a top surface.

FIG. 8a illustrates paint tool 35 with yoke members 38 and 39 pivoted 180 degrees. In this condition, surface 36b becomes the pad-holding surface and surface 36a the top surface. With lugs 38b and 39b positioned inward, a handle with mating lugs can be locked in position therein.

FIG. 9 shows a side view of planar member 36 with a handle 42 attached to yoke member 38 through a wing nut 43 and bolt 44 with a painting pad 34 secured thereto. FIG. 10 shows a front view of planar member 36 with handle 42 secured between yoke members 38 and 39 by bolt 44 that has threads thereon that are in engagement with threaded wing nut 43. In this embodiment, bolt 44 and wing nut 43 allow handle 42 to be secured therebetween.

FIG. 11 shows an end view of a handle 55 having stop 58 and lugs 51 and 56.

FIG. 12 shows a side view of handle 55 with a single handle stop 58 having stop surfaces 58a and 58b for engaging the applicator tool to limit pivotal motion of handle 55. A lug surface 56a projects from head 56 to form locking engagement with yoke members.

Figure 13:
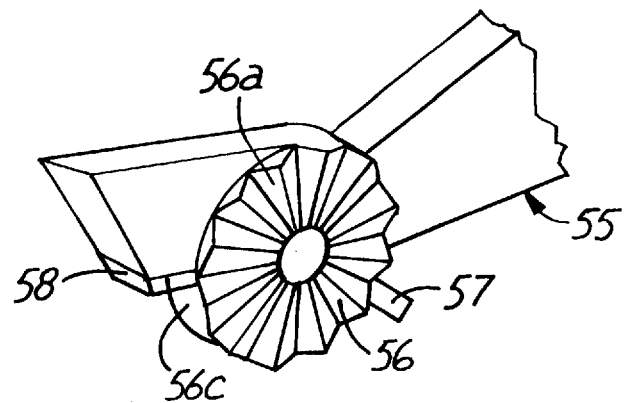
FIG. 13 is a perspective view of a handle for use with the tool of FIG. 11.

FIG. 13 shows a perspective view of a portion of tool 51 with a molded integral handle 55 having a head 56 with a lug surface 56a for engagement with a yoke member. Extending radially outward from head 56 is a first stop 58 and a second stop 57.

Figure 14:
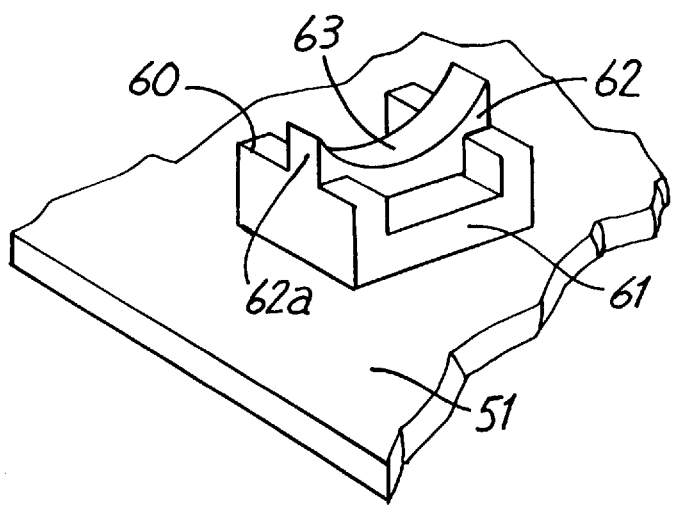
FIG. 14 is a perspective view of an integral handle rest and stop for use with the tool of FIG. 11.

FIG. 14 shows a perspective view of a handle rest 60 for rotateably supporting head 56 therein. Handle rest 60 includes a base 61 with an extension 62 having an arcuate surface 63 that mates with an arcuate surface 56c on head 56. Handle rest 60 nests into recess 54 of planar member 51. Handle rest 60 includes a surface 62a for engaging and abutting against surface 62a on handle rest 60.

Figure 15:
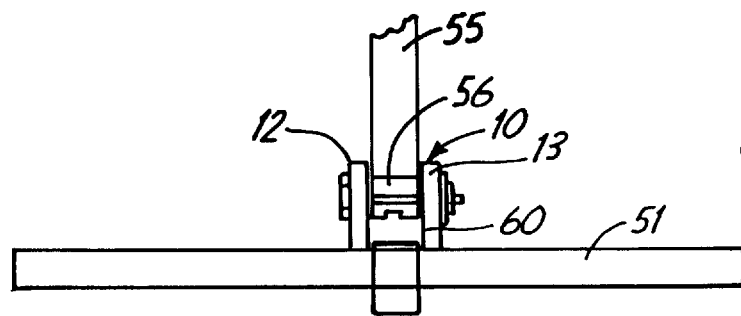
FIG. 15 is a front view of the tool of FIG. 11 engaging the handle of FIG. 13 and the yoke member of FIG. 1.

To illustrate the assembled condition, reference should be made to FIG. 15 which shows handle 55 located between yoke members 12 and 13 of yoke 10. Handle rest 60 is located between yoke members 12 and 13 and is nestled in recess 54 of planar member 51. A stop 58 is shown extending across head 56 with stop 58 engageable with extension 60 to limit the rotational movement of head 56. That is, head 56 can be mounted in yoke 10 to allow the head to be rotateable between a first position wherein first stop 58 engages a first end of extension 62, and a second condition where stop 57 engages the other end of extension 60. In this embodiment, the planar member 51 can pivot with respect to the handle to allow the user to get in tight places.

Figure 16:
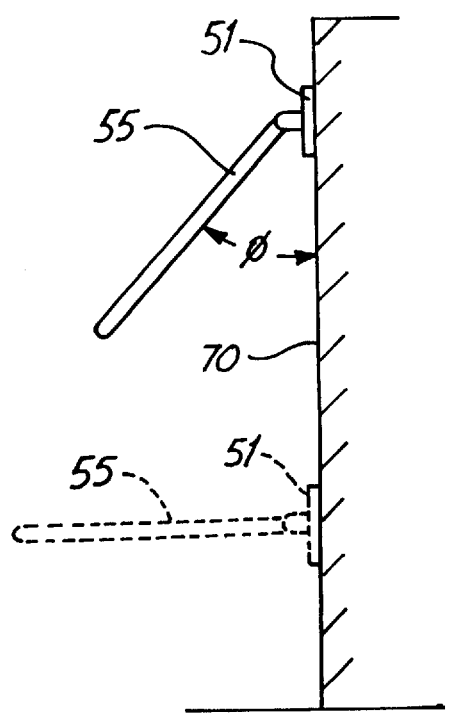
FIG. 16 is a side view illustrating how the tool pivots to accommodate different angles of paint application.

To appreciate how stop 58 can be used, reference should be made to FIG. 16 which shows a wall 70 with paint applicator tool 51 in solid lines and handle 55 pivotally mounted thereto. The angle of pivoting motion is indicated by θ and is determined by the position of stop 58. For example, if the angle θ is limited to 30 degrees, the operator can apply pressure on the lower edge of tool 51. As the operator paints the lower portion of the wall, handle 55 and applicator 51 (shown in dotted lines) pivot with respect to one another to allow the operator to smoothly apply the paint to wall 70.

I claim:

1. A reversible yoke for attachment thereto comprising:

a first yoke member, said first yoke member having an edge, a first side with a lug thereon and a second side with a smooth surface thereon;

a second yoke member, said second yoke member having a first edge, a first side with a lug thereon and a second side with a smooth surface thereon; and a connecting member, said connecting member having a first edge joined to said edge of said first yoke member by a first living hinge, said connecting member having a second edge joined to said first edge of said second yoke member by a second living hinge, with said living hinges bendable into a first yoke position where the lugs are clampable to a member located therebetween and said living hinges bendable into a second yoke position where the smooth surfaces are engageable with a further member located therebetween and the first sides with the lugs thereon are not engageable with the member located therein.

2. The reversible yoke of claim 1 including an opening through said first and second members for inserting a compression member therethrough.

3. The reversible yoke of claim 2 including a handle having a head for sandwiching between said yoke members.

4. The reversible yoke of claim 3 wherein the head has at least one smooth surface for forming pivoting engagement with said yoke members.

5. The reversible yoke of claim 3 wherein the head has at least one lug surface for forming interlocking engagement with one of said yoke members.

6. The reversible yoke of claim 1 including an applicator tool having a first tool-carrying surface and a second oppositely disposed tool-carrying surface.

7. The reversible yoke of claim 6 wherein the applicator tool comprises a painting tool having a handle with a head.

8. The reversible yoke of claim 6, said head has an arcuate section for engaging an arcuate section of a handle rest to provide handle stability.

9. The reversible yoke of claim 8 wherein said handle rest comprises an integral portion of said applicator tool.

10. The reversible yoke of claim 9 wherein said head includes a stop to limit the rotation of said head with respect to said reversible yoke.

11. A yoke for forming a part of a tool comprising:

a first yoke member, said first yoke member having a first edge, a first side and a second side;

a second yoke member, said second yoke member having a first edge, a first side and a second side; and a connecting member, said connecting member having a first edge joined to said edge of said first yoke member by a first living hinge, said connecting member having a second edge joined to said first edge of said second yoke member with said living hinge bendable into a first yoke position where the yoke members first sides are lockably clampable to a member located therebetween, and a second position opposite from said first position where the yoke members second sides are clampable to a further member inserted therebetween to thereby form a pivoting relation thereto.

12. The yoke of claim 11 wherein one of the yoke members includes a barb for securing the yoke member in the tool.

13. The yoke of claim 12 wherein the living hinge is located in a midway position with respect to said yoke to enable said yoke to be postionable within a 180 degree arc to thereby maintain the yoke members in the same spaced condition with respect to the tool.

14. The yoke of claim 13 wherein the second yoke member is integrally connected to said connecting member.

15. The yoke of claim 11 including an applicator tool connected thereto and a handle comprising a head having one surface, with a locking surface for locking the handle to the tool and a second surface with a smooth surface to enable said handle head to be reversed to thereby convert the tool from a tool with a pivoting handle to a tool with a locking handle.

\* \* \* \* \*